United States Patent
Hattori (10) Patent No.: US 8,171,182 B2
(45) Date of Patent: May 1, 2012

(54) METHOD OF INDICATING CONNECTIVITY OF PERIPHERAL DEVICE TO COMPUTER OPERATING SYSTEM

(75) Inventor: Yusuke Hattori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/952,186

(22) Filed: Dec. 7, 2007

(65) Prior Publication Data

US 2009/0150571 A1   Jun. 11, 2009

(51) Int. Cl.
*G06F 3/00* (2006.01)

(52) U.S. Cl. ............... 710/15; 710/16; 710/17; 710/18; 710/19

(58) Field of Classification Search ............... 710/15–19
See application file for complete search history.

(56) References Cited

U.S. PATENT DOCUMENTS

| | | | | |
|---|---|---|---|---|
| 5,898,861 A * | 4/1999 | Emerson et al. | ................ | 703/23 |
| 5,943,503 A * | 8/1999 | Kai | ................ | 708/833 |
| 6,822,753 B1 * | 11/2004 | Momose | ................ | 358/1.13 |
| 7,389,516 B2 * | 6/2008 | Rosenbloom et al. | ........ | 719/321 |
| 2007/0174499 A1 * | 7/2007 | Bhella et al. | ................ | 710/15 |
| 2008/0123135 A1 * | 5/2008 | Inoue | ................ | 358/1.15 |
| 2008/0288633 A1 * | 11/2008 | Evans et al. | ................ | 709/224 |

FOREIGN PATENT DOCUMENTS

| | | |
|---|---|---|
| JP | 05-327715 | 12/1993 |
| JP | 2004-240490 | 8/2004 |

* cited by examiner

*Primary Examiner* — Chun-Kuan Lee (74) *Attorney, Agent, or Firm* — Fitzpatrick, Cella, Harper & Scinto (57) ABSTRACT

This invention provides a method of connecting a network-connected image input device, to which a plug-and-play function cannot be applied to a computer installed with an OS (operating system) and using the image input device. To this end, when a control program of the image input device is activated, the program notifies the OS of information indicating that the peripheral device is connected, irrespective of connection/non-connection between the peripheral device and the computer. Upon reception of a command for activating the peripheral device, the control program confirms the connection/non-connection between the peripheral device and the computer. When the connection is confirmed, the control program controls the peripheral device to activate.

11 Claims, 7 Drawing Sheets

NON-CONNECTED STATE OF USB AND LAN

FIG. 5B

USB-CONNECTED STATE

METHOD OF INDICATING CONNECTIVITY OF PERIPHERAL DEVICE TO COMPUTER OPERATING SYSTEM

BACKGROUND OF THE INVENTION

1. Field of the Invention

The present invention relates to a method of supporting an image input device compatible to a network connection, installation and use of driver software of the image input device in a computer, and a program.

2. Description of the Related Art

As devices used when data on paper media are converted into digital data, and are fetched to computers and the like, image input devices such as an imaging scanner, copying machine, and the like are available. These image input devices can scan many kinds of documents such as monochrome images of text documents and the like, color images of magazines, developed photos, positive and negative films, and the like. A digital camera is also handled as an image input device.

Image input devices are often used by connecting them to computers installed with WINDOWS® operating system (OS) available from Microsoft Corporation using connection methods such as USB (Universal Serial Bus), IEEE1394, SCSI (Small Computer System Interface), and the like. In this case, a service called Windows Image Acquisition (WIA) provided by an interface program is launched. For example, when an image input device is connected to a computer using USB, the OS detects that connection and notifies the WIA service of the detection of connection. Upon reception of the notification, the WIA service loads a control program corresponding to the connected image input device, thus rendering the image input device ready to use. This service is known as plug-and-play.

Also, image input devices are used by connecting them to computers via a network such as Ethernet or the like. When an image input device is connected to a computer via a network, the OS has no function of detecting that connection and notifying the WIA service of the detection of connection like plug-and-play upon connection of the image input device. Therefore, if the image input device is not connected or the power supply of the image input device is not turned on at the activation timing of the OS, that image input device cannot be recognized unless the OS is restarted.

To solve this problem, a technique which uses a dedicated resident program for monitoring detection of a network connection (Japanese Patent Laid-Open No. 2004-240490) and a technique which uses a dedicated device for detecting a network connection (Japanese Patent Laid-Open No. 05-327715) have been proposed. These dedicated resident program and device notify the WIA service of the network connection of the image input device. Upon reception of the notification, the WIA service loads a control program corresponding to the image input device, thus rendering the image input device ready to use. However, the dedicated resident program or device for monitoring detection of a network connection is additionally required.

SUMMARY OF THE INVENTION

The present invention provides a method of allowing the use of an image input device connected after the OS activation timing without using a dedicated resident program or a dedicated device used to monitor detection of a network connection. To this end, the present invention provides a method of supporting, by a computer, a peripheral device connected to the computer installed with an OS (operating system) via a network, comprising the steps of:

installing a program for controlling the peripheral device on the OS;

notifying, when the program for controlling the peripheral device is activated, the OS of information indicating that the peripheral device is connected, irrespective of connection/non-connection between the peripheral device and the computer;

confirming, when the program for controlling the peripheral device receives a command for activating the peripheral device, the connection/non-connection between the peripheral device and the computer;

notifying, when the connection is not confirmed in the step of confirming, the OS of an error; and controlling, when the connection is confirmed in the step of confirming, the peripheral device to activate.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings.

Figure 1:
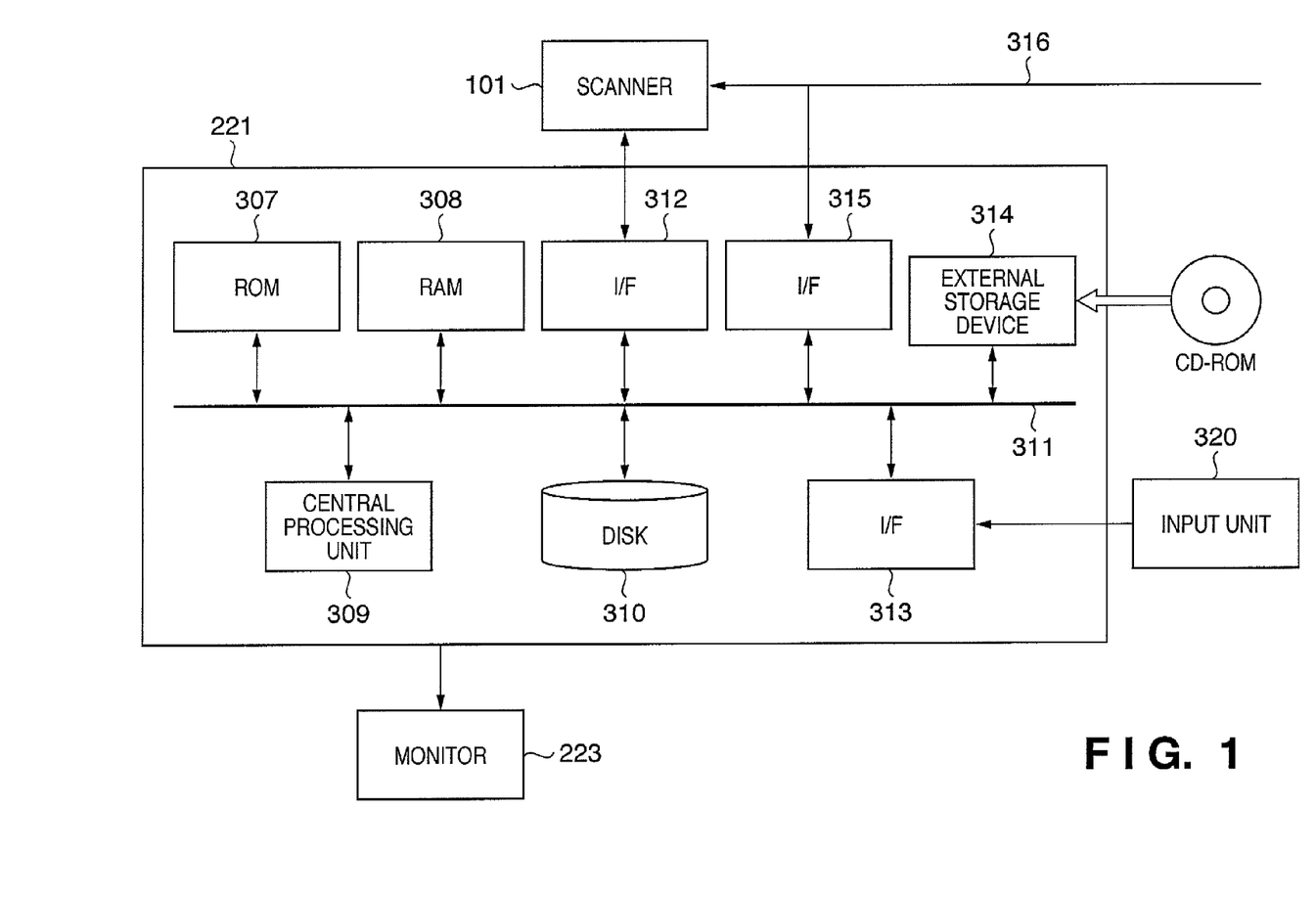
FIG. 1 is a block diagram showing the arrangement of a general computer used as a host PC of a scanner.

A schematic arrangement of a general host PC 221 used in control of a scanner 101 as an image input device will be briefly described below with reference to FIG. 1.

The host PC 221 includes a ROM (read-only memory) 307, RAM (random-access memory) 308, central processing unit 309, disk device 310, bus 311, I/F 312, I/F 313, and external storage device 314. The disk device 310 holds an OS (Operating System) and scanner control program. The ROM 307 stores a program of a basic I/O system (BIOS). The OS is loaded onto the RAM 308, and programs such as the scanner control program and the like are also loaded onto the RAM 308. The RAM 308 provides a storage area and work area required to operate the control program. The central processing unit 309 executes processing according to the programs held on the RAM 308. The bus 311 interconnects the aforementioned components, and allows data exchange among the components. The I/F (interface) 312 is used to make communications with the scanner 101, and is implemented by a USB interface in this embodiment. The I/F 313 connects an input unit 320 such as a mouse, keyboard, and the like. The external storage device 314 is used to drive external storage media such as a floppy disk, CD-ROM (compact disc read-only memory), and the like. When the programs are stored in advance in external storage media in place of the RAM 308, the external storage device 314 reads out and downloads them. Reference numeral 315 denotes an interface for a network connection, which uses an Ethernet network 316 using a TCP/IP (Transmission Control Protocol/Internet Protocol) protocol. Using this interface 315, a network connection with the scanner 101 is established. Monitor 223 is a display apparatus such as a LCD device or a CRT (cathode ray tube).

Figure 2:
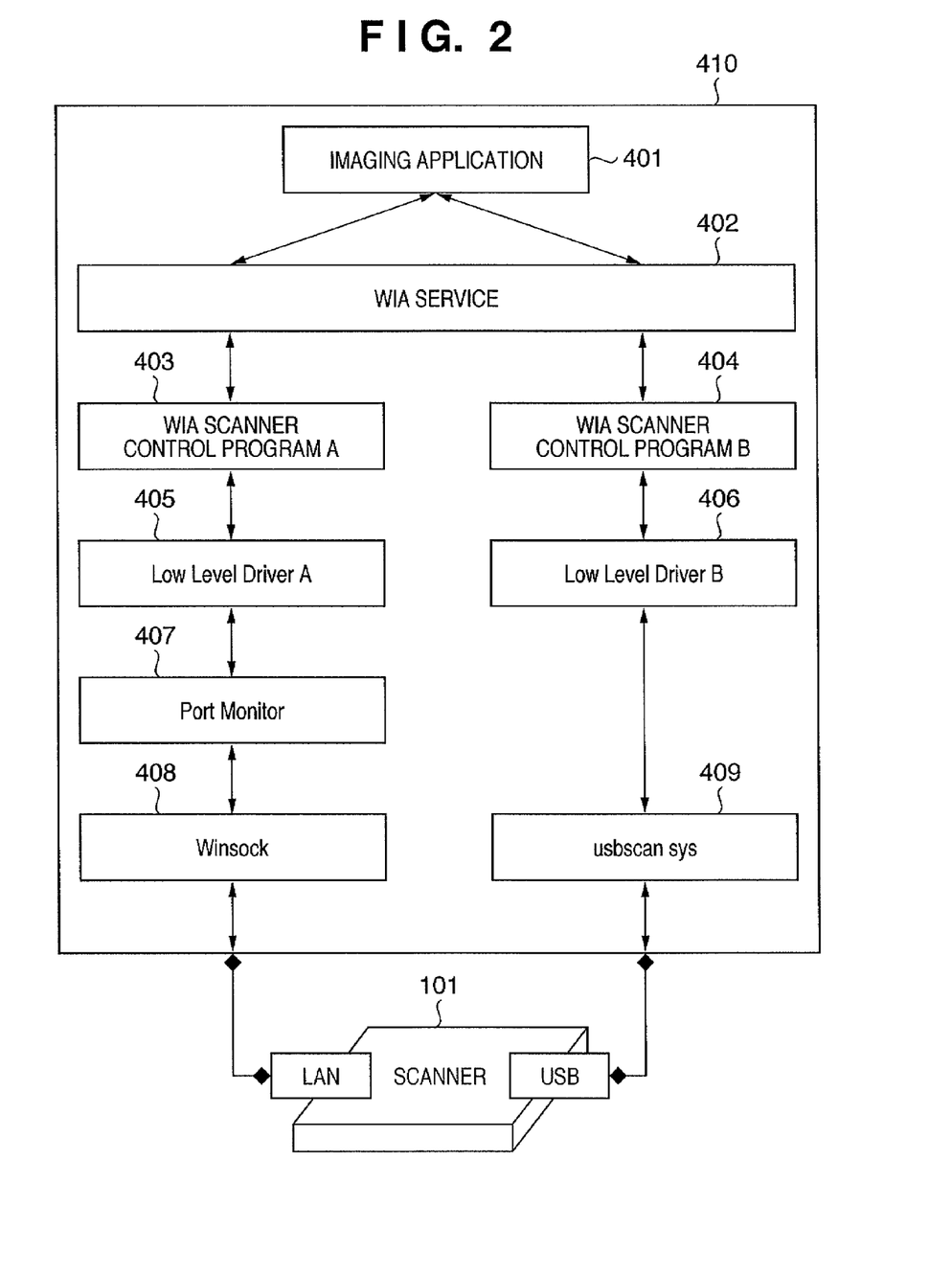
FIG. 2 is a chart showing the relationship among a scanner, WIA scanner driver, and WIA service.

FIG. 2 shows the relationship of programs which run on the host PC 221. An OS 410 is a WINDOWS® (ME, XP, VISTA) operating system. Reference numeral 401 denotes an imaging application program which runs on the OS 410. Reference numeral 402 denotes a WIA service as a standard interface program of the OS. Reference numeral 403 denotes a WIA scanner control program A which controls the scanner under the control of the WIA service. The scanner 101 has two interfaces, i.e., USB and LAN interfaces.

The imaging application 401 issues an image scan request to the WIA service 402 while designating scan setting information in the scanner via an image acquisition application programming interface (API). Note that the setting information is scan information such as document type, color settings, document size, resolution, and the like. The WIA service 402 sends the scan request to a USB-connected scanner to a WIA scanner control program B 404 for USB, and sends an image scan request to a LAN-connected scanner to the WIA scanner control program A 403 for LAN. The WIA scanner control programs A 403 and B 404 respectively send scan settings to Low Level Drivers A 405 and B 406 using scanner commands unique to the scanner. The Low Level Driver A 405 sends the scan command to a Port Monitor 407 which monitors a LAN port. The Port Monitor 407 sends the scan command to the scanner 101 via a Winsock 408 as a kernel I/O for LAN. The Low Level Driver B 406 sends the scan command to the scanner 101 via Usbscan.sys 409 as a kernel I/O for USB. The scanner 101 scans an image according to the received scan commands.

Figure 3:
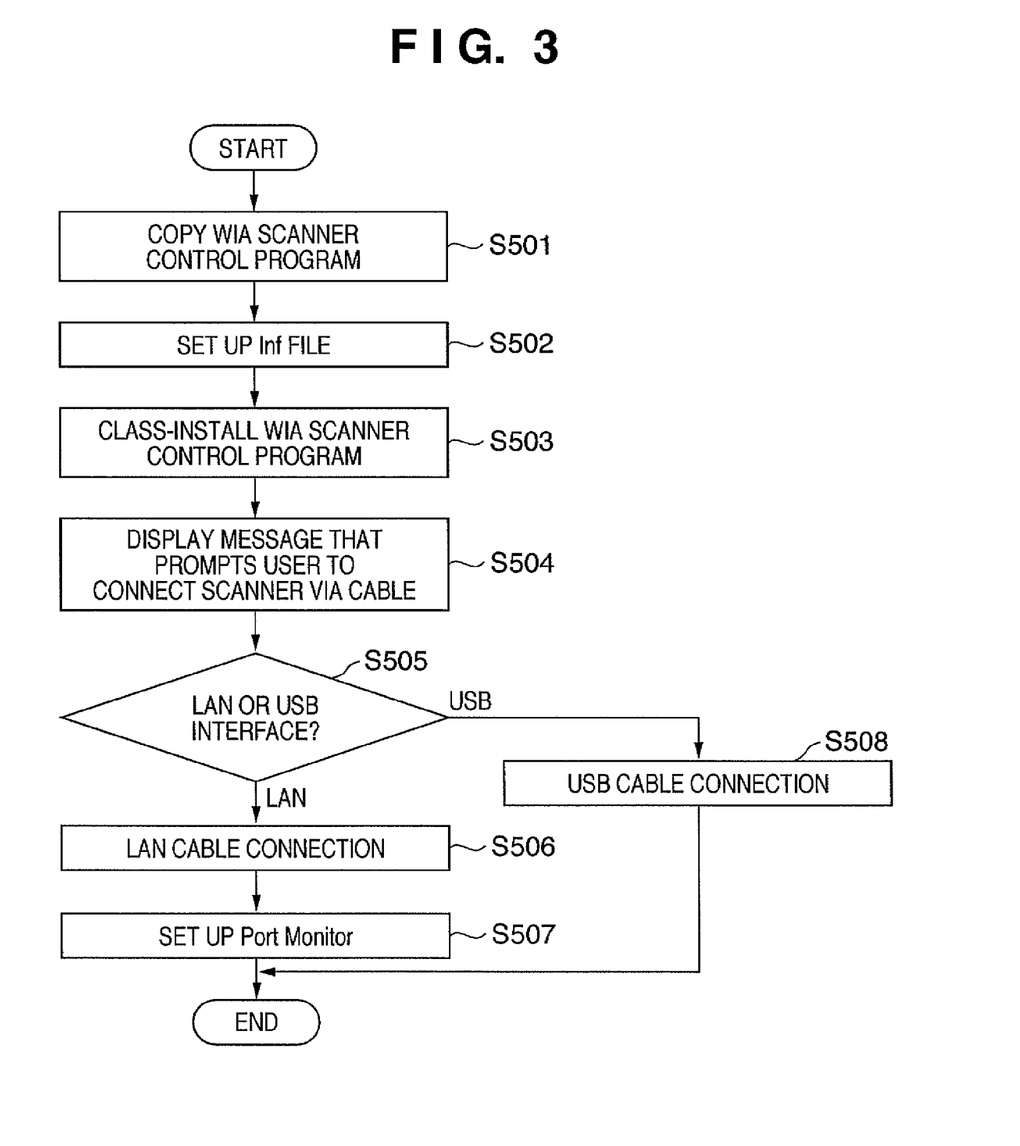
FIG. 3 is a flowchart showing installation of the WIA scanner driver of the first embodiment.
Figure 4:
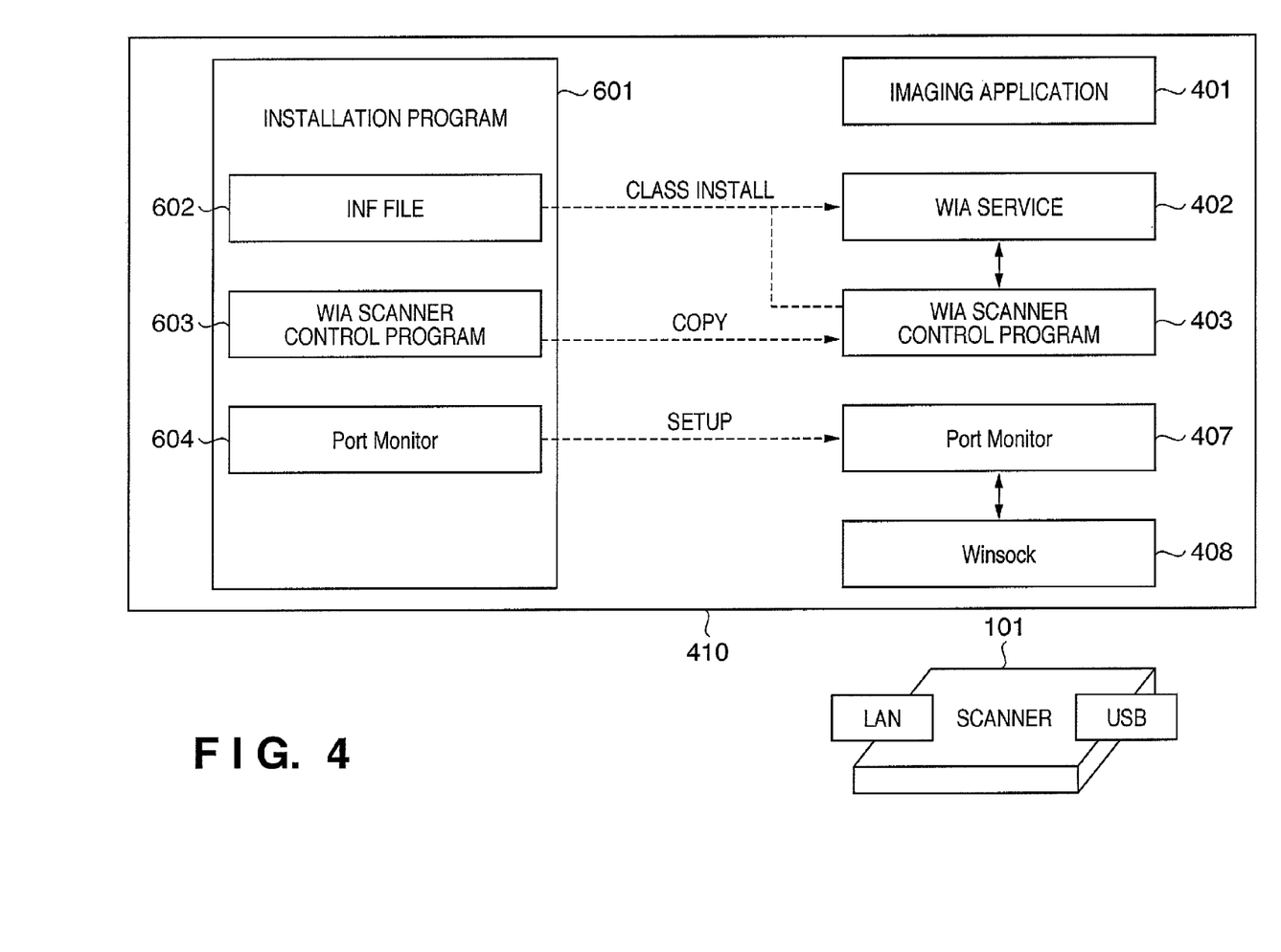
FIG. 4 is a block diagram of the WIA scanner driver, the WIA service, and an installer upon installation of the WIA scanner driver of the first embodiment.

The installation operation of the WIA scanner control program A 403 and Port Monitor 407 will be described below with reference to FIGS. 3 and 4. The installation operation is done when the user activates an installation program 601. Assume that the installation program 601 is stored in a CD-ROM. However, the installation program 601 may be downloaded in advance from a server or the like, which supplies control programs on the network.

The installation program 601 has a WIA scanner control program 603, Port Monitor 604, and INF (information) file 602. The INF file 602 records the copy destination of the WIA scanner control program 603, registry information, and the like, and the installation program 601 executes installation based on these pieces of information. Upon launching the installation program 601, the program 601 copies a file of the WIA scanner control program 603 onto the OS 410 (S501). The program then copies the INF file 602 to a folder "windows¥¥system32¥¥inf" using an API named SetupCopyOEMInf (S502). The program 601 installs the copy of the WIA scanner control program 603 using an API named DiInstallDevice and the like as the WIA scanner control program A 403 (to be referred to as class installation hereinafter) (S503). In this manner, the WIA service 402 is set to always load the class-installed WIA scanner control program A 403 upon activation.

The installation program 601 displays a message that prompts the user to connect the scanner 101 using a LAN or USB cable (S504). The user connects the scanner using a cable according to this message. The installation program detects the connected cable, and branches according to the detected type of cable (S505).

If the scanner 101 and PC 221 are connected using a LAN cable (S506), the installation program 601 sets up the Port Monitor (S507). In this case, the program 601 copies the Port Monitor 407 onto the OS 410, and describes information (the file name of the WIA scanner control program, MAC address, installed directory, and the like) of the scanner 101 in a registry.

If the scanner 101 and PC 221 are connected using the USB cable (S508), the installation program 601 quits. The WINDOWS OS has a scheme for automatically class-installing a control program of a USB-connected device. Hence, after step S506, the OS installs the WIA scanner control program B for USB depending on the description of the INF file 602. In this case, the WIA service 402 loads the WIA scanner control program B for USB only when the scanner 101 and PC 221 are connected.

The operation of the WIA scanner control program A 403 loaded by the WIA service 402 after installation will be described below with reference to FIGS. 5A, 5B and FIG. 6.

Figure 5A:
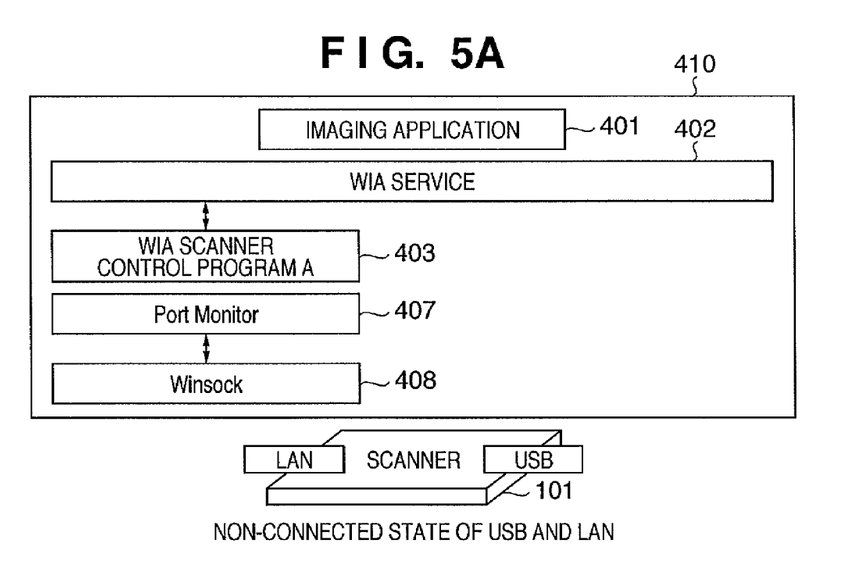
FIG. 5A is a chart showing the relationship between the WIA scanner driver and WIA service in a non-connection state via both a LAN (local area network) and USB of the first embodiment.
Figure 5B:
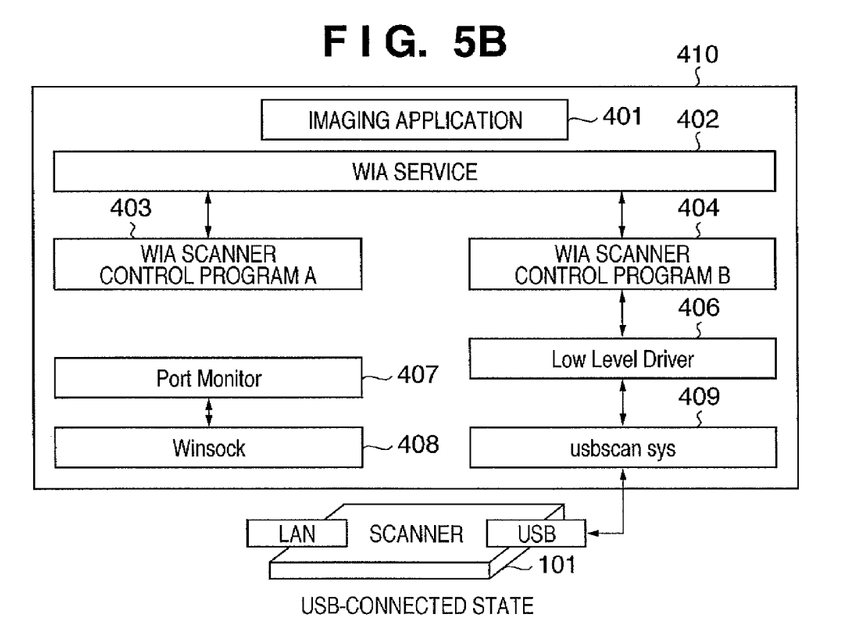
FIG. 5B is a chart showing the relationship between the WIA scanner driver and WIA service in a connection state via USB of the first embodiment.
Figure 6:
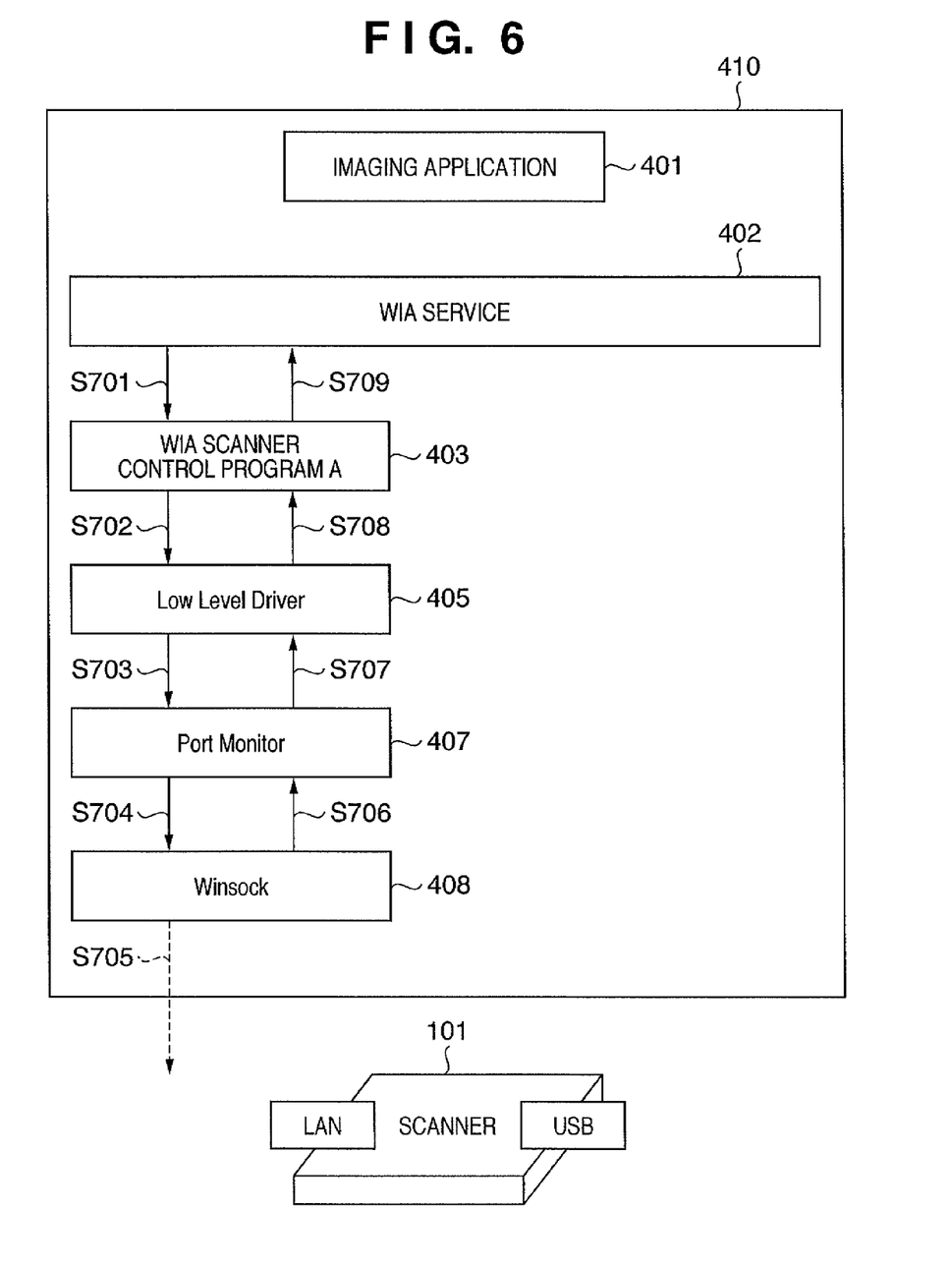
FIG. 6 is a chart showing the operation of a WIA driver loaded by the WIA driver of the first embodiment.

Even when the scanner 101 and PC are not connected using the LAN and USB interfaces, the WIA service 402 loads the WIA scanner control program A 403 for LAN upon activation of the service (FIG. 5A). When the scanner 101 and PC 221 are connected via the USB interface, the WIA service further loads the WIA scanner control program B 404 for USB (FIG. 5B).

Upon activation of the WIA service in the state of FIG. 5A, the WIA service 402 loads the WIA scanner control program A 403 (S701). The loaded WIA scanner control program A 403 loads the Low Level Driver 405 to execute scanner operation preparation processing (S702). The Low Level Driver 405 seeks connection confirmation from the Port Monitor 407 (S703), which seeks connection confirmation from the Winsock 408 (S704). The Winsock 408 searches for the scanner 101 (S705). If the scanner 101 is not connected to the PC 221, the Winsock 408 returns a connection error to the Port Monitor 407 (S706) Hence, the Port Monitor 407 returns an error to the Low Level Driver 405 (S707). The Low Level Driver 405 returns an error to the WIA scanner control program 403 (S708). The WIA scanner control program 403 has failed the scanner operation preparation processing, but returns a success (operation preparation completion) response to the WIA service 402 (S709). Hence, the WIA service 402 recognizes the scanner 101 as operation preparation completion.

The WIA scanner control program A 403 may notify the WIA service 402 of a success (operation preparation completion) (S709) immediately after step S701. The processing operation for a scan command issued to the scanner 101 connected via the LAN will be described below with reference to FIG. 7. This is the case when the user activates the scanner 101 from the imaging application 401 and instructs it to scan an image.

Figure 7:
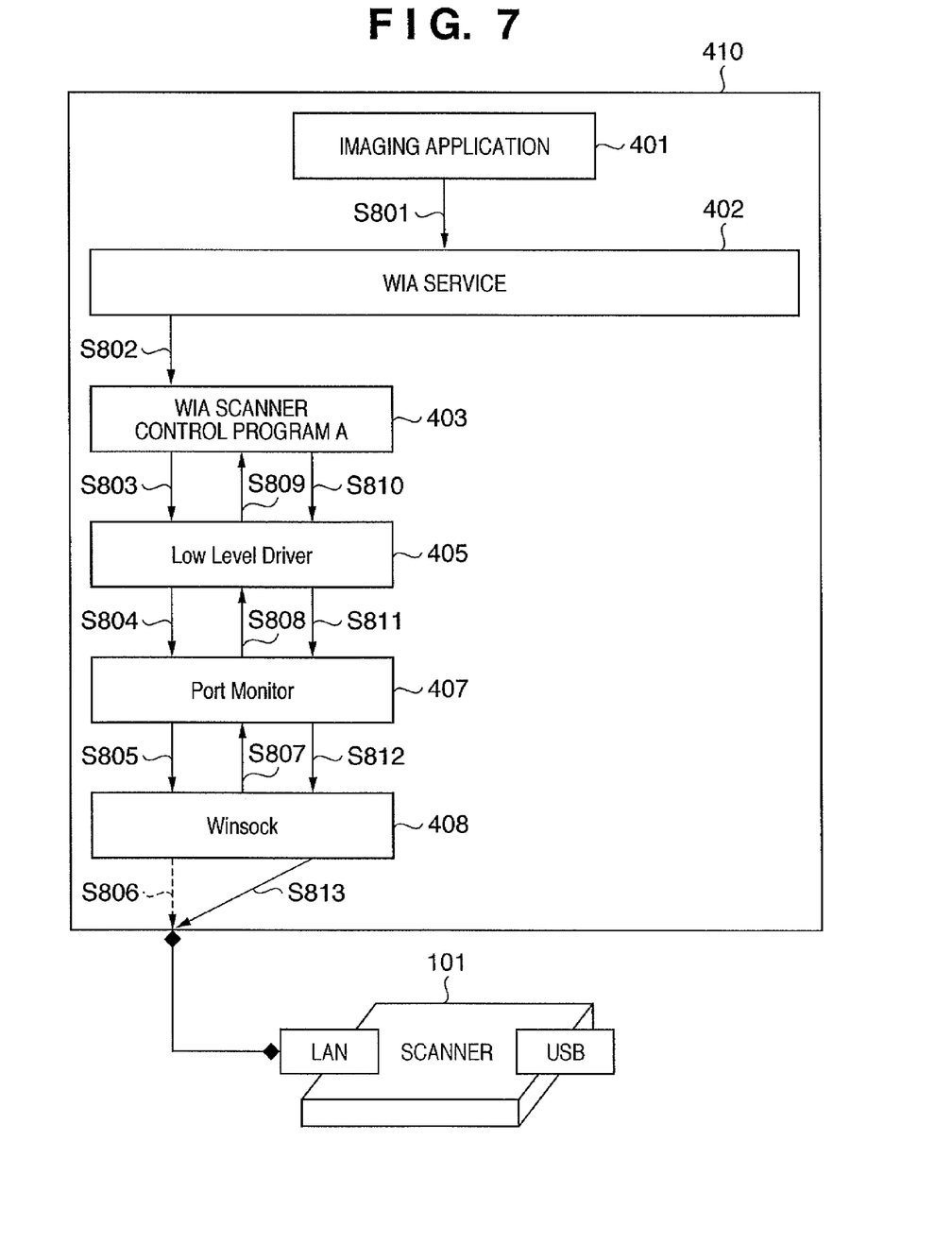
FIG. 7 is a chart showing the operation of the WIA driver when a scan request is issued to the WIA service in the first embodiment.

The imaging application 401 notifies the WIA service 402 of scan setting information and a scan request (S801). The WIA service 402 sends the scan setting information and scan request to the WIA scanner control program A 403 (S802).

The WIA scanner control program A 403 does not promptly start a scan operation, but starts a scan operation after the operation preparation processing. The WIA scanner control program A 403 loads the Low Level Driver 405 to execute the scanner operation preparation processing (S803).

Furthermore, the Low Level Driver 405 seeks connection confirmation from the Port Monitor 407 (S804), which seeks connection confirmation from the Winsock 408 (S805).

The Winsock 408 searches for the scanner 101 (S806), and notifies the Port Monitor 407 of the result (whether the scanner 101 is in a connected or non-connected state) (S807). If the notification result from the Winsock 408 indicates the connected state, the Port Monitor 407 notifies the Low Level Driver 405 of a success; if it indicates non-connected state, the Port Monitor 407 notifies the Low Level Driver 405 of an error (S808). If the notification result from the Port Monitor 407 indicates a success, the Low Level Driver 405 notifies the WIA scanner control program A 403 of a success; if it indicates an error, the Low Level Driver 405 notifies the WIA scanner control program A 403 of the error (S809). If the notification result from the Low Level Driver 405 indicates a success, the WIA scanner control program A 403 sends a scan start request to the Low Level Driver 405 (S810). If the notification result from the Low Level Driver 405 indicates an error, the WIA scanner control program A 403 notifies the WIA service 402 of the error, and the WIA service 402 cancels the scan request.

If the scanner 101 is in the connected state, the Low Level Driver 405 which received the scan start request sends the scan start request to the Port Monitor 407 (S811). The Port Monitor 407 sends the scan start request to the Winsock 408 (S812), which sends a scan start command to the scanner 101 (S813). The scanner 101 scans an image according to the command, and scanner status information and scanned image data from the scanner 101 are sent to the WIA scanner control program A 403 following the aforementioned path in the reverse direction. The scanned image data is sent to the imaging application 401 after it is processed by the WIA scanner control program A 403.

When the image input device is connected to the PC via the USB interface that allows the OS to notify the interface program of the connection, the processing can be done according to the conventional plug-and-play function.

Note that the WIA scanner control program A 403 is activated after the WIA service is activated upon activation of the OS. Alternatively, activation means of that program may be additionally provided. By activating the WIA scanner control program A 403, it can send information indicating the connection of the scanner to the OS. While the OS recognizes the scanner connection, a scanner command can be issued. That is, the user need only activate the WIA scanner control program A 403 after he or she uses the scanner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of supporting, by a computer, a peripheral device connected to the computer, wherein the computer is installed with (a) an OS (operating system) and (b) a control program that controls the peripheral device via a network, the method comprising the steps of:
   a step (i) in which the control program, which is activated when the OS is activated, notifies the OS of peripheral device connection information as if the peripheral device is connected, irrespective of connectivity between the peripheral device and the computer;
   a step (ii) in which the control program, after the peripheral device connection information indicating as if the peripheral device is connected is notified to the OS in step (i), checks whether or not the peripheral device is connected to the computer when the control program receives a command for activating the peripheral device, without the use of a dedicated resident program or device to monitor connectivity;
   a step (iii) in which the control program notifies the OS of an error when the checking step finds that the peripheral device is not connected to the computer; and
   a step (iv) in which the control program controls the peripheral device to be activated when the checking step finds that the peripheral device is connected to the computer.

2. The method according to claim 1, wherein an interface program which interfaces the OS and the control program runs on the OS, and the step of notifying the OS of the connection information and the step of notifying the OS of the error are executed by respectively notifying the interface program of the connection information and the error.

3. The method according to claim 2, wherein the activation in the step of notifying the OS of the connection information is made by loading and activating the control program when the interface program is activated by the OS.

4. The method according to claim 2, wherein the OS is MICROSOFT WINDOWS™, and the interface program is a Windows Image Acquisition service program.

5. The method according to claim 2, wherein the step of checking receives, via the interface program, the command for activating the peripheral device from an application program installed in the computer.

6. The method according to claim 1, wherein the peripheral device is an image input device.

7. The method according to claim 1, wherein the control program loads a low level driver which drives the peripheral device when the control program for controlling the peripheral device is activated.

8. The method according to claim 1, wherein the step in which the control program notifies the OS of peripheral device connection information as if the peripheral device is connected irrespective of connectivity is performed after the control program has been installed on the computer and after an INF file for the peripheral device has been copied to the computer.

9. The method according to claim 1, wherein the control program controls the peripheral device via a driver installed in the computer.

10. The method according to claim 1, wherein the control program controls the peripheral device via (a) a driver installed in the computer and (b) a winsock component that performs kernel input/output for a network.

11. A program stored in a computer readable storage medium for installing a control program that controls a peripheral device so as to support, by a computer, the peripheral device connected to the computer via a network, wherein the computer is installed with an operating system (OS), said program comprising:
   the control program that controls the peripheral device;
   an information file which records a copy location of said control program upon installation; and
   an installation program which copies said control program to the computer so as to be activated upon activation of the OS in accordance with information of said information file,
   wherein said control program, having been installed in the computer, comprises the steps of:
   a step (i) in which said control program, which is activated when said OS is activated, notifies the OS of peripheral device connection information as if the peripheral device is connected, irrespective of connectivity between the peripheral device and the computer;

a step (ii) in which said control program, after the peripheral device connection information indicating as if the peripheral device is connected is notified to the OS in step (i), checks whether or not the peripheral device is connected to the computer when said control program receives a command for activating the peripheral device, without the use of a dedicated resident program or device to monitor connectivity;

a step (iii) in which said control program notifies the OS of an error when the checking step finds that the peripheral device is not connected to the computer; and a step (iv) in which said control program controls the peripheral device to be activated when the checking step finds that the peripheral device is not connected to the computer.

* * * * *